US007287197B2

(12) United States Patent
Bennett et al.

(10) Patent No.: US 7,287,197 B2
(45) Date of Patent: *Oct. 23, 2007

(54) VECTORING AN INTERRUPT OR EXCEPTION UPON RESUMING OPERATION OF A VIRTUAL MACHINE

(75) Inventors: Steven M. Bennett, Hillsboro, OR (US); Andrew V. Anderson, Hillsboro, OR (US); Stalinselvaraj Jeyasingh, Beaverton, OR (US); Alain Kagi, Portland, OR (US); Gilbert Neiger, Portland, OR (US); Richard Uhlig, Hillsboro, OR (US); Michael Kozuch, Export, PA (US); Lawrence Smith, Beaverton, OR (US); Scott Rodgers, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 579 days.

This patent is subject to a terminal disclaimer.

(21) Appl. No.: 10/663,205

(22) Filed: Sep. 15, 2003

(65) Prior Publication Data
US 2005/0060703 A1    Mar. 17, 2005

(51) Int. Cl.
*G06F 11/00* (2006.01)
(52) U.S. Cl. .................. 714/48; 714/38; 718/1
(58) Field of Classification Search .............. 718/1
See application file for complete search history.

(56) References Cited
U.S. PATENT DOCUMENTS

| | | | |
|---|---|---|---|
| 3,699,532 A | 10/1972 | Schaffer et al. | |
| 3,996,449 A | 12/1976 | Attanasio et al. | |
| 4,037,214 A | 7/1977 | Birney et al. | |
| 4,162,536 A | 7/1979 | Morley | |
| 4,207,609 A | 6/1980 | Luiz et al. | |
| 4,247,905 A | 1/1981 | Yoshida et al. ............. | 711/166 |
| 4,276,594 A | 6/1981 | Morley | |
| 4,278,837 A | 7/1981 | Best | |
| 4,307,447 A | 12/1981 | Provanzano et al. | |

(Continued)

FOREIGN PATENT DOCUMENTS

DE    4217444    12/1992

(Continued)

OTHER PUBLICATIONS

Hall, Judith S., et al., "Virtualizing the VAX Architecture," ACM SIGARCH Computer Architecture News, Proceedings of the 18th annual international symposium on Computer architecture, vol. 19, Issue No. 3, Apr. 1991, 10 pages.

(Continued)

*Primary Examiner*—Robert Beausoliel
*Assistant Examiner*—Yolanda L Wilson
(74) *Attorney, Agent, or Firm*—Blakely, Sokoloff, Taylor & Zafman LLP (57) ABSTRACT

In one embodiment, a request to transition control to a virtual machine (VM) is received from a virtual machine monitor (VMM) and a determination is made as to whether the VMM has requested a delivery of a fault to the VM. If the determination is positive, the fault is delivered to the VM when control is transitioned to the VM.

26 Claims, 4 Drawing Sheets

U.S. PATENT DOCUMENTS

| | | | |
|---|---|---|---|
| 4,319,233 A | 3/1982 | Matsuoka et al. | |
| 4,319,323 A | 3/1982 | Ermolovich et al. | |
| 4,347,565 A | 8/1982 | Kaneda et al. | |
| 4,366,537 A | 12/1982 | Heller et al. | |
| 4,403,283 A | 9/1983 | Myntti et al. | |
| 4,419,724 A | 12/1983 | Branigin et al. | |
| 4,430,709 A | 2/1984 | Schleupen et al. | |
| 4,521,852 A | 6/1985 | Guttag | |
| 4,571,672 A | 2/1986 | Hatada et al. | |
| 4,621,318 A | 11/1986 | Maeda | |
| 4,759,064 A | 7/1988 | Chaum | |
| 4,795,893 A | 1/1989 | Ugon | |
| 4,802,084 A | 1/1989 | Ikegaya et al. | |
| 4,825,052 A | 4/1989 | Chemin et al. | |
| 4,907,270 A | 3/1990 | Hazard | |
| 4,907,272 A | 3/1990 | Hazard | |
| 4,910,774 A | 3/1990 | Barakat | |
| 4,975,836 A | 12/1990 | Hirosawa et al. | |
| 5,007,082 A | 4/1991 | Cummins | |
| 5,022,077 A | 6/1991 | Bealkowski et al. | |
| 5,075,842 A | 12/1991 | Lai | |
| 5,079,737 A | 1/1992 | Hackbarth | 711/164 |
| 5,187,802 A | 2/1993 | Inoue et al. | |
| 5,230,069 A | 7/1993 | Brelsford et al. | |
| 5,237,616 A | 8/1993 | Abraham et al. | |
| 5,255,379 A | 10/1993 | Melo | |
| 5,287,363 A | 2/1994 | Wolf et al. | |
| 5,293,424 A | 3/1994 | Holtey et al. | |
| 5,295,251 A | 3/1994 | Wakui et al. | |
| 5,317,705 A | 5/1994 | Gannon et al. | |
| 5,319,760 A | 6/1994 | Mason et al. | |
| 5,361,375 A | 11/1994 | Ogi | |
| 5,386,552 A | 1/1995 | Garney | |
| 5,421,006 A | 5/1995 | Jablon et al. | |
| 5,434,999 A | 7/1995 | Goire et al. | |
| 5,437,033 A | 7/1995 | Inoue et al. | |
| 5,442,645 A | 8/1995 | Ugon et al. | |
| 5,455,909 A | 10/1995 | Blomgren et al. | |
| 5,459,867 A | 10/1995 | Adams et al. | |
| 5,459,869 A | 10/1995 | Spilo | |
| 5,469,557 A | 11/1995 | Salt et al. | |
| 5,473,692 A | 12/1995 | Davis | |
| 5,479,509 A | 12/1995 | Ugon | |
| 5,504,922 A | 4/1996 | Seki et al. | |
| 5,506,975 A * | 4/1996 | Onodera | 718/1 |
| 5,511,217 A | 4/1996 | Nakajima et al. | |
| 5,522,075 A * | 5/1996 | Robinson et al. | 718/100 |
| 5,528,231 A | 6/1996 | Patarin | |
| 5,533,126 A | 7/1996 | Hazard et al. | |
| 5,555,385 A | 9/1996 | Osisek | |
| 5,555,414 A | 9/1996 | Hough et al. | |
| 5,560,013 A | 9/1996 | Scalzi et al. | |
| 5,564,040 A | 10/1996 | Kubals | |
| 5,566,323 A | 10/1996 | Ugon | |
| 5,568,552 A | 10/1996 | Davis | |
| 5,574,936 A | 11/1996 | Ryba et al. | |
| 5,582,717 A | 12/1996 | Di Santo | |
| 5,604,805 A | 2/1997 | Brands | |
| 5,606,617 A | 2/1997 | Brands | |
| 5,615,263 A | 3/1997 | Takahashi | |
| 5,628,022 A | 5/1997 | Ueno et al. | |
| 5,633,929 A | 5/1997 | Kaliski, Jr. | |
| 5,657,445 A | 8/1997 | Pearce | |
| 5,668,971 A | 9/1997 | Neufeld | |
| 5,684,948 A | 11/1997 | Johnson et al. | |
| 5,706,469 A | 1/1998 | Kobayashi | |
| 5,717,903 A | 2/1998 | Bonola | |
| 5,720,609 A | 2/1998 | Pfefferle | |
| 5,721,222 A | 2/1998 | Bernstein et al. | |
| 5,729,760 A | 3/1998 | Poisner | |
| 5,737,604 A | 4/1998 | Miller et al. | |
| 5,737,760 A | 4/1998 | Grimmer, Jr. et al. | 711/163 |
| 5,740,178 A | 4/1998 | Jacks et al. | |
| 5,752,046 A | 5/1998 | Oprescu et al. | |
| 5,757,919 A | 5/1998 | Herbert et al. | |
| 5,764,969 A | 6/1998 | Kahle | |
| 5,796,835 A | 8/1998 | Saada | |
| 5,796,845 A | 8/1998 | Serikawa et al. | |
| 5,805,712 A | 9/1998 | Davis | |
| 5,809,546 A | 9/1998 | Greenstein et al. | |
| 5,825,875 A | 10/1998 | Ugon | |
| 5,825,880 A | 10/1998 | Sudia et al. | |
| 5,835,594 A | 11/1998 | Albrecht et al. | |
| 5,844,986 A | 12/1998 | Davis | |
| 5,852,717 A | 12/1998 | Bhide et al. | |
| 5,854,913 A | 12/1998 | Goetz et al. | |
| 5,867,577 A | 2/1999 | Patarin | |
| 5,872,994 A | 2/1999 | Akiyama et al. | |
| 5,890,189 A | 3/1999 | Nozue et al. | |
| 5,900,606 A | 5/1999 | Rigal | |
| 5,901,225 A | 5/1999 | Ireton et al. | |
| 5,903,752 A | 5/1999 | Dingwall et al. | |
| 5,919,257 A | 7/1999 | Trostle | |
| 5,935,242 A | 8/1999 | Madany et al. | |
| 5,935,247 A | 8/1999 | Pai et al. | |
| 5,937,063 A | 8/1999 | Davis | |
| 5,944,821 A | 8/1999 | Angelo | |
| 5,953,502 A | 9/1999 | Helbig, Sr. | |
| 5,956,408 A | 9/1999 | Arnold | |
| 5,970,147 A | 10/1999 | Davis et al. | |
| 5,978,475 A | 11/1999 | Schneier et al. | |
| 5,978,481 A | 11/1999 | Ganesan et al. | |
| 5,987,557 A | 11/1999 | Ebrahim | |
| 6,014,745 A | 1/2000 | Ashe | |
| 6,035,374 A | 3/2000 | Panwar et al. | |
| 6,044,478 A | 3/2000 | Green | |
| 6,055,637 A | 4/2000 | Hudson et al. | |
| 6,058,478 A | 5/2000 | Davis | |
| 6,061,794 A | 5/2000 | Angelo | |
| 6,075,938 A | 6/2000 | Bugnion et al. | |
| 6,085,296 A | 7/2000 | Karkhanis et al. | |
| 6,088,262 A | 7/2000 | Nasu | |
| 6,092,095 A | 7/2000 | Maytal | |
| 6,093,213 A | 7/2000 | Favor et al. | |
| 6,101,584 A | 8/2000 | Satou et al. | |
| 6,108,644 A | 8/2000 | Goldschlag et al. | |
| 6,115,816 A | 9/2000 | Davis | |
| 6,125,430 A | 9/2000 | Noel et al. | |
| 6,131,166 A | 10/2000 | Wong-Isley | |
| 6,148,379 A | 11/2000 | Schimmel | |
| 6,158,546 A | 12/2000 | Hanson et al. | |
| 6,173,417 B1 | 1/2001 | Merrill | |
| 6,175,924 B1 | 1/2001 | Arnold | |
| 6,175,925 B1 | 1/2001 | Nardone et al. | |
| 6,178,509 B1 | 1/2001 | Nardone | |
| 6,182,089 B1 | 1/2001 | Ganapathy et al. | |
| 6,188,257 B1 | 2/2001 | Buer | |
| 6,192,455 B1 | 2/2001 | Bogin et al. | |
| 6,199,152 B1 | 3/2001 | Kelly et al. | |
| 6,205,550 B1 | 3/2001 | Nardone et al. | |
| 6,212,635 B1 | 4/2001 | Reardon | |
| 6,222,923 B1 | 4/2001 | Schwenk | |
| 6,249,872 B1 | 6/2001 | Wildgrube et al. | 713/200 |
| 6,252,650 B1 | 6/2001 | Nakamura | |
| 6,269,392 B1 | 7/2001 | Cotichini et al. | |
| 6,272,533 B1 | 8/2001 | Browne et al. | 709/213 |
| 6,272,637 B1 | 8/2001 | Little et al. | 713/194 |
| 6,275,933 B1 | 8/2001 | Fine et al. | |
| 6,282,650 B1 | 8/2001 | Davis | |
| 6,282,651 B1 | 8/2001 | Ashe | |
| 6,282,657 B1 | 8/2001 | Kaplan et al. | |
| 6,292,874 B1 | 9/2001 | Barnett | 711/153 |
| 6,301,646 B1 | 10/2001 | Hostetter | |
| 6,308,270 B1 | 10/2001 | Guthery et al. | |

| | | | |
|---|---|---|---|
| 6,314,409 B2 | 11/2001 | Schneck et al. | |
| 6,321,314 B1 | 11/2001 | Van Dyke | |
| 6,327,652 B1 | 12/2001 | England et al. | |
| 6,330,670 B1 | 12/2001 | England et al. | |
| 6,339,815 B1 | 1/2002 | Feng | |
| 6,339,816 B1 | 1/2002 | Bausch | |
| 6,357,004 B1 | 3/2002 | Davis | |
| 6,363,485 B1 | 3/2002 | Adams | |
| 6,374,286 B1 | 4/2002 | Gee et al. | |
| 6,374,317 B1 | 4/2002 | Ajanovic et al. | 710/105 |
| 6,378,068 B1 | 4/2002 | Foster | |
| 6,378,072 B1 | 4/2002 | Collins et al. | |
| 6,389,537 B1 | 5/2002 | Davis et al. | |
| 6,397,242 B1 | 5/2002 | Devine et al. | |
| 6,397,379 B1 | 5/2002 | Yates, Jr. et al. | |
| 6,412,035 B1 | 6/2002 | Webber | |
| 6,421,702 B1 | 7/2002 | Gulick | |
| 6,435,416 B1 | 8/2002 | Slassi | |
| 6,445,797 B1 | 9/2002 | McGough et al. | |
| 6,463,535 B1 | 10/2002 | Drews et al. | |
| 6,463,537 B1 | 10/2002 | Tello | |
| 6,496,847 B1 | 12/2002 | Bugnion et al. | |
| 6,499,123 B1 | 12/2002 | McFarland et al. | |
| 6,505,279 B1 | 1/2003 | Phillips et al. | |
| 6,507,904 B1 | 1/2003 | Ellison et al. | |
| 6,529,909 B1 | 3/2003 | Bowman-Amuah | |
| 6,535,988 B1 | 3/2003 | Poisner | |
| 6,557,104 B2 | 4/2003 | Vu et al. | |
| 6,560,627 B1 | 5/2003 | McDonald et al. | |
| 6,609,199 B1 | 8/2003 | DeTreville | |
| 6,615,278 B1 | 9/2003 | Curtis | |
| 6,633,963 B1 | 10/2003 | Ellison et al. | |
| 6,633,981 B1 | 10/2003 | Davis | |
| 6,651,171 B1 | 11/2003 | England et al. | |
| 6,678,825 B1 | 1/2004 | Ellison et al. | |
| 6,684,326 B1 | 1/2004 | Cromer et al. | |
| 2001/0021969 A1 | 9/2001 | Burger et al. | |
| 2001/0027511 A1 | 10/2001 | Wakabayashi et al. | |
| 2001/0027527 A1 | 10/2001 | Khidekel et al. | |
| 2001/0037450 A1 | 11/2001 | Metlitski et al. | |
| 2002/0007456 A1 | 1/2002 | Peinado et al. | |
| 2002/0023032 A1 | 2/2002 | Pearson et al. | |
| 2002/0147916 A1 | 10/2002 | Strongin et al. | |
| 2002/0166061 A1 | 11/2002 | Falik et al. | |
| 2002/0169717 A1 | 11/2002 | Challener | |
| 2003/0018892 A1 | 1/2003 | Tello | |
| 2003/0074548 A1 | 4/2003 | Cromer et al. | |
| 2003/0115453 A1 | 6/2003 | Grawrock | |
| 2003/0126442 A1 | 7/2003 | Glew et al. | |
| 2003/0126453 A1 | 7/2003 | Glew et al. | |
| 2003/0159056 A1 | 8/2003 | Cromer et al. | |
| 2003/0188179 A1 | 10/2003 | Challener et al. | |
| 2003/0196085 A1 | 10/2003 | Lampson et al. | |
| 2004/0117539 A1 | 6/2004 | Bennett et al. | |
| 2005/0060702 A1* | 3/2005 | Bennett et al. | 718/1 |

FOREIGN PATENT DOCUMENTS

| | | |
|---|---|---|
| EP | 0473913 | 3/1992 |
| EP | 0600112 | 6/1994 |
| EP | 0602867 | 6/1994 |
| EP | 0892521 | 1/1999 |
| EP | 0930567 | 7/1999 |
| EP | 0961193 | 12/1999 |
| EP | 0965902 | 12/1999 |
| EP | 1030237 | 8/2000 |
| EP | 1055989 | 11/2000 |
| EP | 1056014 | 11/2000 |
| EP | 1085396 | 3/2001 |
| EP | 1146715 | 10/2001 |
| EP | 1209563 | 5/2002 |
| EP | 1271277 | 1/2003 |
| JP | 2000076139 | 3/2000 |
| WO | WO9524696 | 9/1995 |
| WO | WO9729567 | 8/1997 |
| WO | WO9812620 | 3/1998 |
| WO | WO9834365 | 8/1998 |
| WO | WO9844402 | 10/1998 |
| WO | WO9905600 | 2/1999 |
| WO | WO9918511 | 4/1999 |
| WO | WO9957863 | 11/1999 |
| WO | WO9965579 | 12/1999 |
| WO | WO0021238 | 4/2000 |
| WO | WO0062232 | 10/2000 |
| WO | WO0127723 | 4/2001 |
| WO | WO0127821 | 4/2001 |
| WO | WO0163994 | 8/2001 |
| WO | WO0175565 | 10/2001 |
| WO | WO0175595 | 10/2001 |
| WO | WO0201794 | 1/2002 |
| WO | WO9909482 | 1/2002 |
| WO | WO0217555 | 2/2002 |
| WO | WO 02/052404 A2 | 7/2002 |
| WO | WO02052404 A2 * | 7/2002 |
| WO | WO02060121 | 8/2002 |
| WO | WO0175564 | 10/2002 |
| WO | WO02086684 | 10/2002 |
| WO | WO03058412 | 7/2003 |
| WO | WO 2004/003749 A3 | 1/2004 |

OTHER PUBLICATIONS

PCT Search Report, Int'l. Application No. PCT/US2004/030387, mailed Mar. 2, 2005, (6 pages).

Berg, Cliff, "How Do I Create a Signed Applet?", *Dr. Dobb's Journal*, (Aug. 1997), 1-9.

Brands, Stefan, "Restrictive Blinding of Secret-Key Certificates", *Springer-Verlag XP002201306*, (1995),Chapter 3.

Chien, Andrew A., et al., "Safe and Protected Execution for the Morph/AMRM Reconfigurable Processor", *7th Annual IEEE Symposium, FCCM '99 Proceedings, XP010359180, ISBN 0-7695-0375-6, Los Alamitos, CA*, (Apr. 21, 1999), 209-221.

Compaq Computer Corporation, "Trusted Computing Platform Alliance (TCPA) Main Specification Version 1.1a", *XP002272822*, (Jan. 25, 2001), 1-321.

Coulouris, George, et al., "Distributed Systems, Concepts and Designs", *2nd Edition*, (1994), 422-424.

Crawford, John, "Architecture of the Intel 80386", *Proceedings of the IEEE International Conference on Computer Design: VLSI in Computers and Processors (ICCD '86)*, (Oct. 6, 1986),155-160.

Davida, George I., et al., "Defending Systems Against Viruses through Cryptographic Authentication", *Proceedings of the Symposium on Security and Privacy*, IEEE Comp. Soc. Press, ISBN 0-8186-1939-2,(May 1989).

Fabry, R.S., "Capability-Based Addressing", *Fabry, R.S., "Capability-Based Addressing," Communications of the ACM*, vol. 17, No. 7, (Jul. 1974),403-412.

Frieder, Gideon, "The Architecture And Operational Characteristics of the VMX Host Machine", *The Architecture And Operational Characteristics of the VMX Host Machine, IEEE*, (1982),9-16.

Goldberg, Robert P., "Survey of Virtual Machine Research", *COMPUTER Magazine*, (Jun. 1974), 34-35.

Gong, Li, et al., "Going Beyond the Sandbox: An Overview of the New Security Architecture in the Java Development Kit 1.2", *Proceedings of the USENIX Symposium on Internet Technologies and Systems*, Monterey, CA,(Dec. 1997).

Gum, P. H., "System/370 Extended Architecture: Facilities for Virtual Machines", *IBM J. Research Development*, vol. 27, No. 6, (Nov. 1983), 530-544.

Heinrich, Joe, "MIPS R4000 Microprocessor User's Manual, Second Edition", *Chapter 4 "Memory Management"*, (Jun. 11, 1993), 61-97.

HP Mobile Security Overview, "HP Mobile Security Overview", (Sep. 2002), 1-10.

IBM, "Information Display Technique for a Terminate Stay Resident Program IBM Technical Disclosure Bulletin", *TDB-ACC-No. NA9112156*, vol. 34, Issue 7A, (Dec. 1, 1991), 156-158.

IBM Corporation, "IBM ThinkPad T30 Notebooks", *IBM Product Specification,* located at www-1.ibm.com/services/files/cisco_t30_spec_sheet_070202.pdf, last visited Jun. 23, 2004, (Jul. 2, 2002), 1-6.

INTEL, "IA-32 Intel Architecture Software Developer's Manual", vol. 3: *System Programming Guide*, Intel Corporation—2003, 13-1 through 13-24.

INTEL, "Intel386 DX Microprocessor 32-Bit CHMOS Microprocessor With Integrated Memory Management", (1995),5-56.

Intel Corporation, "IA-64 System Abstraction Layer Specification", *Intel Product Specification, Order No. 245359-001*, (Jan. 2000), 1-112.

Intel Corporation, "Intel 82802AB/82802AC Firmware Hub (FWH)", *Intel Product Datasheet*, Document No. 290658-004,(Nov. 2000), 1-6, 17-28.

Intel Corporation, "Intel IA-64 Architecture Software Developer's Manual", vol. 2: *IA-64 System Architecture, Order No. 245318-001*, (Jan. 2000), i, ii, 5.1-5.3, 11.1-11.8, 11.23-11.26.

Karger, Paul a., et al., "A VMM Security Kernal for the VAX Architecture", *Proceedings of the Symposium on Research in Security and Privacy, XP010020182, ISBN 0-8186-2060-9, Boxborough, MA*, (May 7, 1990), 2-19.

Kashiwagi, Kazuhiko, et al., "Design and Implementation of Dynamically Reconstructing System Software", *Software Engineering Conference*, Proceedings 1996 Asia-Pacific Seoul, South Korea 4-7 Dec. 1996, Los Alamitos, CA USA, IEEE Comput. Soc, US, ISBN 0-8186-7638-8, (1996).

Lawton, Kevin, et al., "Running Multiple Operating Systems Concurrently on an IA32 PC Using Virtualization Techniques", http://www.plex86.org/research/paper.txt, (Nov. 29, 1999), 1-31.

Luke, Jahn, et al., "Replacement Strategy for Aging Avionics Computers", *IEEE AES Systems Magazine*, XP002190614,(Mar. 1999).

Menezes, Alfred J., et al., "Handbook of Applied Cryptography", *CRC Press LLC, USA XP002201307*, (1997),475.

Menezes, Alfred J., et al., "Handbook of Applied Cryptography", *CRC Press Series on Discrete Mathematics and its Applications*, Boca Raton, FL, XP002165287, ISBN 0849385237,(Oct. 1996),403-405, 506-515, 570.

Motorola, "M68040 User's Manual", (1993), 1-1 to 8-32.

Nanba, S., et al., "VM/4: ACOS-4 Virtual Machine Architecture", *VM/4: ACOS-4 Virtual Machine Architecture, IEEE*, (1985), 171-178.

Richt, Stefan, et al., "In-Circuit-Emulator Wird Echtzeittauglich", *Elektronic, Franzis Verlag GMBH, Munchen, DE*, vol. 40, No. 16, XP000259620, (100-103), 8-6-1991.

Robin, John S., et al., "Analysis of the Pentium's Ability to Support a Secure Virtual Machine Monitor", *Proceedings of the 9th USENIX Security Symposium, XP002247347, Denver, Colorado*, (Aug. 14, 2000), 1-17.

Rosenblum, M., "Virtual Platform: A Virtual Machine Monitor for Commodity PC", *Proceedings of the 11th Hotchips Conference*, (Aug. 17, 1999), 185-196.

RSA Security, "Hardware Authenticators", www.rsasecurity.com/node.asp?id=1158, 1-2.

RSA Security, "RSA SecurID Authenticators", www.rsasecurity.com/products/securid/datashets/SID_DS_0103. pdf, 1-2.

RSA Security, "Software Authenticators", www.srsasecurity.com/node.asp?id=1313, 1-2.

Saez, Sergio , et al., "A Hardware Scheduler for Complex Real-Time Systems", *Proceedings of the IEEE International Symposium on Industrial Electronics*, XP002190615, (Jul. 1999),43-48.

Schneier, Bruce, "Applied Cryptography: Protocols, Algorithm, and Source Code in C", *Wiley, John & Sons, Inc.*, XP002939871; ISBM 0471117099, (Oct. 1995),47-52.

Schneier, Bruce, "Applied Cryptography: Protocols, Algorithm, and Source Code in C", *Wiley, John & Sons, Inc.*, XP002138607; ISBM 0471117099, (Oct. 1995),56-65.

Schneier, Bruce, "Applied Cryptography: Protocols, Algorithms, and Source Code C", *Wiley, John & Sons, Inc.*, XP0021111449; ISBN 0471117099, (Oct. 1995), 169-187.

Schneier, Bruce, "Applied Cryptography: Protocols, Algorithms, and Source Code in C", *2nd Edition: Wiley, John & Sons, Inc.*, XP002251738; ISBM 0471128457, (Nov. 1995),28-33; 176-177; 216-217; 461-473; 518-522.

Sherwood, Timothy, et al., "Patchable Instruction ROM Architecture", *Department of Computer Science and Engineering, University of California, San Diego, La Jolla, CA*, (Nov. 2001).

\* cited by examiner

| Bit Position | Contents |
|---|---|
| 7:0 | Vector of interrupt or exception |
| 9:8 | Interruption type (0 = external interrupt; 1 = software interrupt; 2 = NMI; 3 = exception) |
| 10 | Reserved and unused |
| 11 | Delivery error code (0 = do not deliver; 1 = deliver) |
| 20:12 | Reserved and unused |
| 31 | Valid (1 = valid; 0 = not valid) |

VECTORING AN INTERRUPT OR EXCEPTION UPON RESUMING OPERATION OF A VIRTUAL MACHINE

FIELD

Embodiments of the invention relate generally to virtual machines, and more specifically to handling faults in a virtual machine environment.

BACKGROUND

A conventional virtual-machine monitor (VMM) typically runs on a computer and presents to other software the abstraction of one or more virtual machines. Each virtual machine may function as a self-contained platform, running its own "guest operating system" (i.e., an operating system (OS) hosted by the VMM) and other software, collectively referred to as guest software. The guest software expects to operate as if it were running on a dedicated computer rather than a virtual machine. That is, the guest software expects to control various events and have access to hardware resources. The hardware resources may include processor-resident resources (e.g., control registers), resources that reside in memory (e.g., descriptor tables) and resources that reside on the underlying hardware platform (e.g., input-output devices). The events may include internal interrupts, external interrupts, exceptions, platform events (e.g., initialization (INIT) or system management interrupts (SMIs)), and the like.

In a virtual-machine environment, the VMM should be able to have ultimate control over the events and hardware resources as described in the previous paragraph to provide proper operation of guest software running on the virtual machines and for protection from and among guest software running on the virtual machines. To achieve this, the VMM typically receives control when guest software accesses a protected resource or when other events (such as interrupts or exceptions) occur. For example, when an operation in a virtual machine supported by the VMM causes a system device to generate an interrupt, the currently running virtual machine is interrupted and control of the processor is passed to the VMM. The VMM then receives the interrupt, and handles the interrupt itself or invokes an appropriate virtual machine and delivers the interrupt to that virtual machine.

BRIEF DESCRIPTION OF THE DRAWINGS

The invention may be best understood by referring to the following description and accompanying drawings that are used to illustrates embodiments of the invention. In the drawings.

DESCRIPTION OF EMBODIMENTS

A method and apparatus for handling a fault in a virtual-machine environment using fault information provided by a VMM are described. In the following description, for purposes of explanation, numerous specific details are set forth. It will be apparent, however, to one skilled in the art that embodiments of the invention can be practiced without these specific details.

Some portions of the detailed descriptions that follow are presented in terms of algorithms and symbolic representations of operations on data bits within a computer system's registers or memory. These algorithmic descriptions and representations are the means used by those skilled in the data processing arts to convey the substance of their work to others skilled in the art most effectively. An algorithm is here, and generally, conceived to be a self-consistent sequence of operations leading to a desired result. The operations are those requiring physical manipulations of physical quantities. Usually, although not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that discussions utilizing terms such as "processing" or "computing" or "calculating" or "determining" or the like, may refer to the action and processes of a computer system, or similar electronic computing device, that manipulates and transforms data represented as physical (electronic) quantities within the computer system's registers and memories into other data similarly represented as physical quantities within the computer-system memories or registers or other such information storage, transmission or display devices.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments.

Although the below examples may describe embodiments of the present invention in the context of execution units and logic circuits, other embodiments of the present invention can be accomplished by way of software. For example, in some embodiments, the present invention may be provided as a computer program product or software which may include a machine or computer-readable medium having stored thereon instructions which may be used to program a computer (or other electronic devices) to perform a process according to the present invention. In other embodiments, steps of the present invention might be performed by specific hardware components that contain hardwired logic for performing the steps, or by any combination of programmed computer components and custom hardware components.

Thus, a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, a transmission over the Internet, electrical, optical, acoustical or other forms of propagated signals (e.g., carrier waves, infrared signals, digital signals, etc.) or the like.

Further, a design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, data representing a hardware model may be the data specifying the presence or absence of various features on different mask layers for masks used to produce the integrated circuit. In any representation of the design, the data may be stored in any form of a machine-readable medium. An optical or electrical wave modulated or otherwise generated to transmit such information, a memory, or a magnetic or optical storage such as a disc may be the machine readable medium. Any of these mediums may "carry" or "indicate" the design or software information. When an electrical carrier wave indicating or carrying the code or design is transmitted, to the extent that copying, buffering, or re-transmission of the electrical signal is performed, a new copy is made. Thus, a communication provider or a network provider may make copies of an article (a carrier wave) embodying techniques of the present invention.

Figure 1:
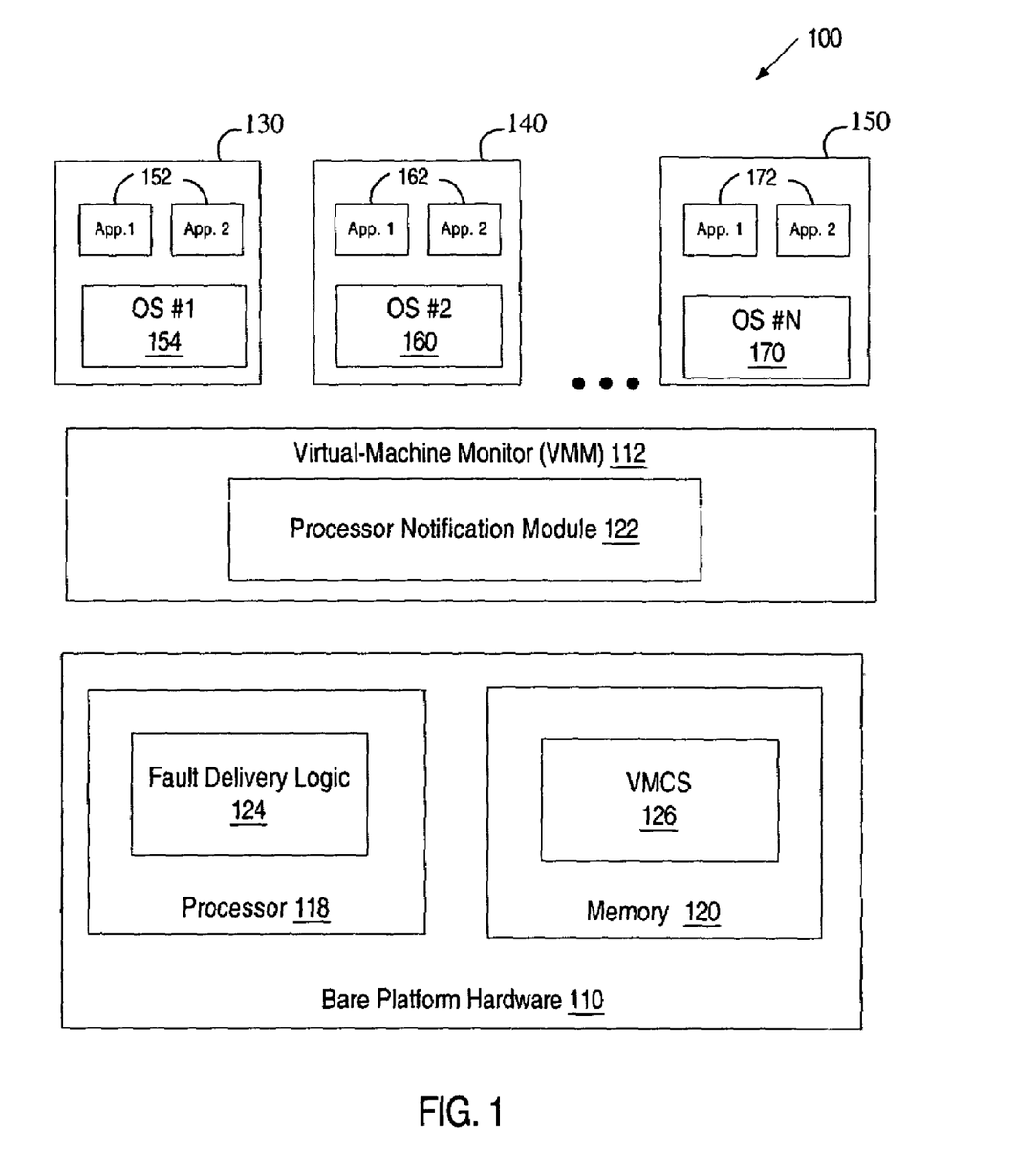
FIG. 1 illustrates one embodiment of a virtual-machine environment, in which some embodiments of the present invention may operate.

FIG. 1 illustrates a virtual-machine environment 100, in which some embodiments of the present invention may operate. In the virtual-machine environment 100, bare platform hardware 110 comprises a computing platform, which may be capable, for example, of executing a standard operating system (OS) and/or a virtual-machine monitor (VMM), such as a VMM 112. The VMM 112, though typically implemented in software, may emulate and export a bare machine interface to higher level software. Such higher level software may comprise a standard or real-time OS, may be a highly stripped down operating environment with limited operating system functionality, or may not include traditional OS facilities. Alternatively, for example, the VMM 112 may be run within, or on top of, another VMM. VMMs and their typical features and functionality are well known by those skilled in the art and may be implemented, for example, in software, firmware, hardware or by a combination of various techniques.

The platform hardware 110 includes a processor 118 and memory 120. Processor 118 can be any type of processor capable of executing software, such as a microprocessor, digital signal processor, microcontroller, or the like. Though only one processor 118 is shown in FIG. 1, the platform hardware 110 may include one or more such processors.

Memory 120 can be any type of recordable/non-recordable media (e.g., random access memory (RAM), read only memory (ROM), magnetic disk storage media, optical storage media, flash memory devices, etc.), as well as electrical, optical, acoustical or other form of propagated signals (e.g., carrier waves, infrared signals, digital signals, etc.), any combination of the above devices, or any other type of machine medium readable by processor 118. Memory 120 may store instructions for performing the execution of method embodiments of the present invention.

The platform hardware 110 can be of a personal computer (PC), mainframe, handheld device, portable computer, set-top box, or any other computing system.

The VMM 112 presents to other software (i.e., "guest" software) the abstraction of one or more virtual machines (VMs), which may provide the same or different abstractions to the various guests. FIG. 1 shows three VMs, 130, 140 and 150. The guest software running on each VM may include a guest OS such as a guest OS 154, 160 or 170 and various guest software applications 152, 162 and 172.

The guest OSs 154, 160 and 170 expect to access physical resources (e.g., processor registers, memory and input-output (I/O) devices) within corresponding VMs (e.g., VM 130, 140 and 150) on which the guest OSs are running and to perform other functions. For example, the guest OS expects to have access to all registers, caches, structures, I/O devices, memory and the like, according to the architecture of the processor and platform presented in the VM. The resources that can be accessed by the guest software may either be classified as "privileged" or "non-privileged." For privileged resources, the VMM 112 facilitates functionality desired by guest software while retaining ultimate control over these privileged resources. Non-privileged resources do not need to be controlled by the VMM 112 and can be accessed by guest software.

Further, each guest OS expects to handle various fault events such as exceptions (e.g., page faults, general protection faults, etc.), interrupts (e.g., hardware interrupts, software interrupts), and platform events (e.g., initialization (INIT) and system management interrupts (SMIs)). Some of these fault events are "privileged" because they must be handled by the VMM 112 to ensure proper operation of VMs 130 through 150 and for protection from and among guest software.

When a privileged fault event occurs or guest software attempts to access a privileged resource, control may be transferred to the VMM 112. The transfer of control from guest software to the VMM 112 is referred to herein as a VM exit. After facilitating the resource access or handling the event appropriately, the VMM 112 may return control to guest software. The transfer of control from the VMM 112 to guest software is referred to as a VM entry. In one embodiment, the VMM 112 requests the processor 118 to perform a VM entry by executing a VM entry instruction.

In one embodiment, the processor 118 controls the operation of the VMs 130, 140 and 150 in accordance with data stored in a virtual machine control structure (VMCS) 126. The VMCS 126 is a structure that may contain state of guest software, state of the VMM 112, execution control information indicating how the VMM 112 whishes to control operation of guest software, information controlling transitions between the VMM 112 and a VM, etc. In one embodiment, the VMCS is stored in memory 120. In some embodiments, multiple VMCS structures are used to support multiple VMs.

When a privileged fault event occurs, the VMM 112 may handle the fault itself or decide that the fault needs to be handled by an appropriate VM. If the VMM 112 decides that the fault is to be handled by a VM, the VMM 112 requests the processor 118 to invoke this VM and to deliver the fault to this VM. In one embodiment, the VMM 112 accomplishes this by setting a fault indicator to a delivery value and generating a VM entry request. In one embodiment, the fault indicator is stored in the VMCS 126.

In one embodiment, the processor 118 includes fault delivery logic 124 that receives the request of the VMM 112 for a VM entry and determines whether the VMM 122 has requested the delivery of a fault to the VM. In one embodiment, the fault delivery logic 124 makes this determination based on the current value of the fault indicator stored in the VMCS 126. If the fault delivery logic 124 determines that the VMM has requested the delivery of the fault to the VM, it delivers the fault to the VM when transitioning control to this VM.

In one embodiment, delivering of the fault involves searching a redirection structure for an entry associated with the fault being delivered, extracting from this entry a descriptor of the location of a routine designated to handle this fault, and jumping to the beginning of the routine using the descriptor. Routines designated to handle corresponding interrupts, exceptions or any other faults are referred to as handlers. In some instruction set architectures (ISAs), certain faults are associated with error codes that may need to be pushed onto stack (or provided in a hardware register or via other means) prior to jumping to the beginning of the handler.

During the delivery of a fault, the processor 118 may perform one or more address translations, converting an address from a virtual to physical form. For example, the address of the interrupt table or the address of the associated handler may be a virtual address. The processor may also need to perform various checks during the delivery of a fault. For example, the processor may perform consistency checks such as validation of segmentation registers and access addresses (resulting in limit violation faults, segment-not-present faults, stack faults, etc.), permission level checks that may result in protection faults (e.g., general-protection faults), etc.

Address translations and checking during fault vectoring may result in a variety of faults, such as page faults, general protection faults, etc. Some faults occurring during the delivery of a current fault may cause a VM exit. For example, if the VMM 112 requires VM exists on page faults to protect and virtualize the physical memory, then a page fault occurring during the delivery of a current fault to the VM will result in a VM exit.

In one embodiment, the fault delivery logic 124 addresses the above possible occurrences of additional faults by checking whether the delivery of the current fault was successful. If the fault delivery logic 124 determines that the delivery was unsuccessful, it further determines whether a resulting additional fault causes a VM exit. If so, the fault delivery logic 124 generates a VM exit. If not, the fault delivery logic 124 delivers the additional fault to the VM.

Figure 2:
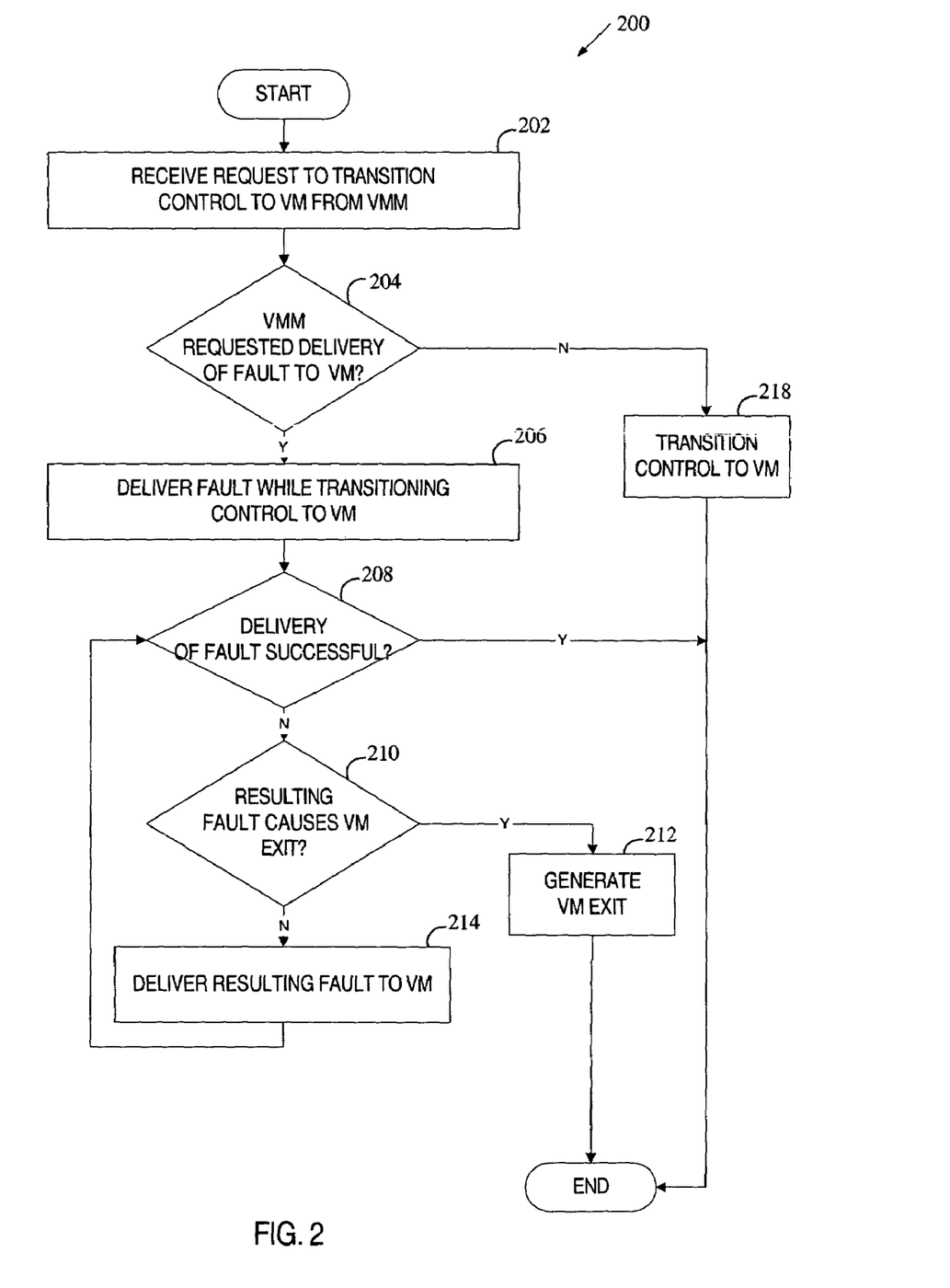
FIG. 2 is a flow diagram of one embodiment of a process for handling faults in a virtual machine environment.

FIG. 2 is a flow diagram of one embodiment of a process 200 for handling faults in a virtual machine environment. The process may be performed by processing logic that may comprise hardware (e.g., circuitry, dedicated logic, programmable logic, microcode, etc.), software (such as that run on a general purpose computer system or a dedicated machine), or a combination of both. In one embodiment, process 200 is performed by fault delivery logic 124 of FIG. 1.

Referring to FIG. 2, process 200 begins with processing logic receiving a request to transition control to a VM from a VMM (processing block 202). In one embodiment, the request to transition control is received via a VM entry instruction executed by the VMM.

At decision box 204, processing logic determines whether the VMM has requested a delivery of a fault to the VM that is to be invoked. A fault may be an internal interrupt (e.g., software interrupt), an external interrupt (e.g., hardware interrupt), an exception (e.g., page fault), a platform event (e.g., initialization (INIT) or system management interrupts (SMIs)), or any other fault event. In one embodiment, processing logic determines whether the VMM has requested the delivery of a fault by reading the current value of a fault indicator maintained by the VMM. The fault indicator may reside in the VMCS or any other data structure accessible to the VMM and processing logic 200. In one embodiment, when the VMM wants to have a fault delivered to a VM, the VMM sets the fault indicator to the delivery value and then generates a request to transfer control to this VM. If no fault delivery is needed during a VM entry, the VMM sets the fault indicator to a no-delivery value prior to requesting the transfer of control to the VM. This is discussed below with respect to FIG. 3.

If processing logic determines that the VMM has requested a delivery of a fault, processing logic delivers the fault to the VM while transitioning control to the VM (processing block 206). Processing logic then checks whether the delivery of the fault was successful (decision box 208). If so, process 200 ends. If not, processing logic determines whether a resulting additional fault causes a VM exit (decision box 210). If so, processing logic generates a VM exit (processing block 212). If not, processing logic delivers the additional fault to the VM (processing block 214), and, returning to processing block 208, checks whether this additional fault was delivered successfully. If so, process 200 ends. If not, processing logic returns to decision box 210.

If processing logic determines that the VMM has not requested a delivery of a fault, processing logic transitions control to the VM without performing any fault related operations (processing block 218).

Figure 3:
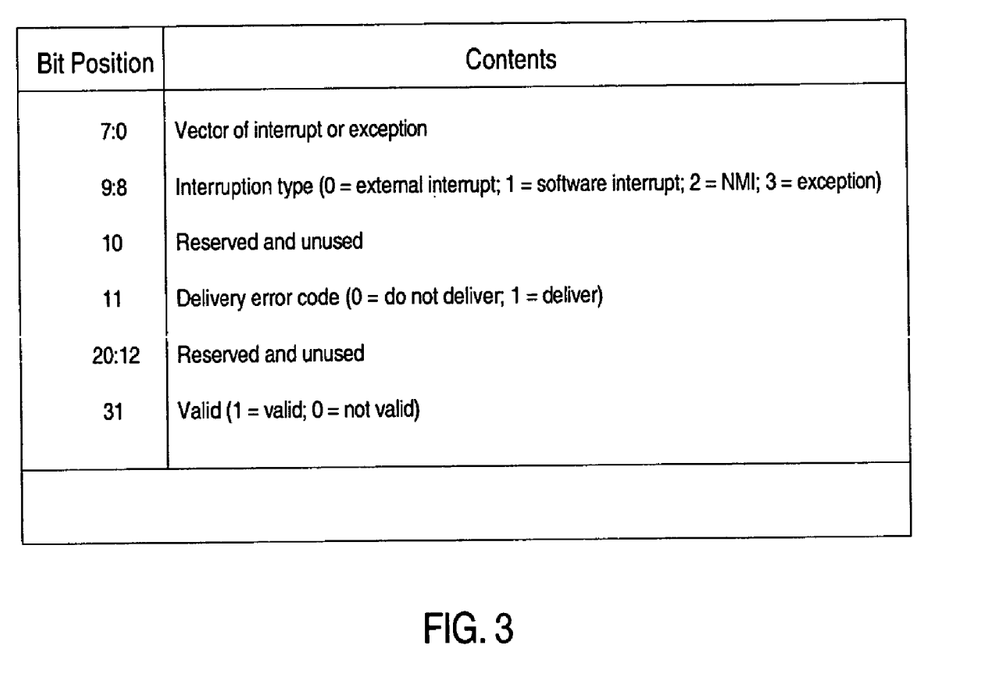
FIG. 3 illustrates an exemplary format of a VMCS field that stores fault identifying information.

In one embodiment, when processing logic needs to deliver a fault to a VM, it searches a redirection structure (e.g., the interrupt-descriptor table in the instruction set architecture (ISA) of the Intel® Pentium® 4 (referred to herein as the IA-32 ISA)) for an entry associated with the fault being delivered, extracts from this entry a descriptor of a handler associated with this fault, and jumps to the beginning of the handler using the descriptor. The interrupt-descriptor table may be searched using fault identifying information such as a fault identifier and a fault type (e.g., external interrupt, internal interrupt, non-maskable interrupt (NMI), exception, etc.). In one embodiment, certain faults (e.g., some exceptions) are associated with error codes that need to be pushed onto stack (or provided in a hardware register or via other means) prior to jumping to the beginning of the handler. In one embodiment, the fault identifying information and associated error code are provided by the VMM using a designated data structure. In one embodiment, the designated data structure is part of the VMCS. FIG. 3 illustrates an exemplary format of a VMCS field that stores fault identifying information. This VMCS field is referred to as a fault information field.

Referring to FIG. 3, in one embodiment, the fault information field is a 32-bit field in which the first 8 bits store an identifier of a fault (e.g., an interrupt or exception), the next 2 bits identify the type of the fault (e.g., external interrupt, software interrupt, NMI, exception, etc.), bit 11 indicates whether an error code (if any) associated with this fault is to be provided to a corresponding handler (by pushing onto the stack, stored in a hardware register, etc.), and bit 31 is a fault indicator that specifies whether a fault is to be delivered to a VM as discussed above.

If bit 11 of the fault information field indicates that an error code is to be provided to the handler, a second VMCS field is accessed to obtain the error code associated with this fault. The second VMCS field is referred to as a fault error code field.

In one embodiment, when the VMM wants a fault to be delivered to a VM, the VMM stores the fault identifier and the fault type in the fault information field and sets the fault indicator (bit 31) to a delivery value (e.g., bit 31=1). In addition, if the fault is associated with an error code that needs to be provided to the handler, the VMM sets bit 11 to a delivery value (e.g., bit 11=1) and stores the error code value in the fault error code field in the VMCS.

Figure 4:
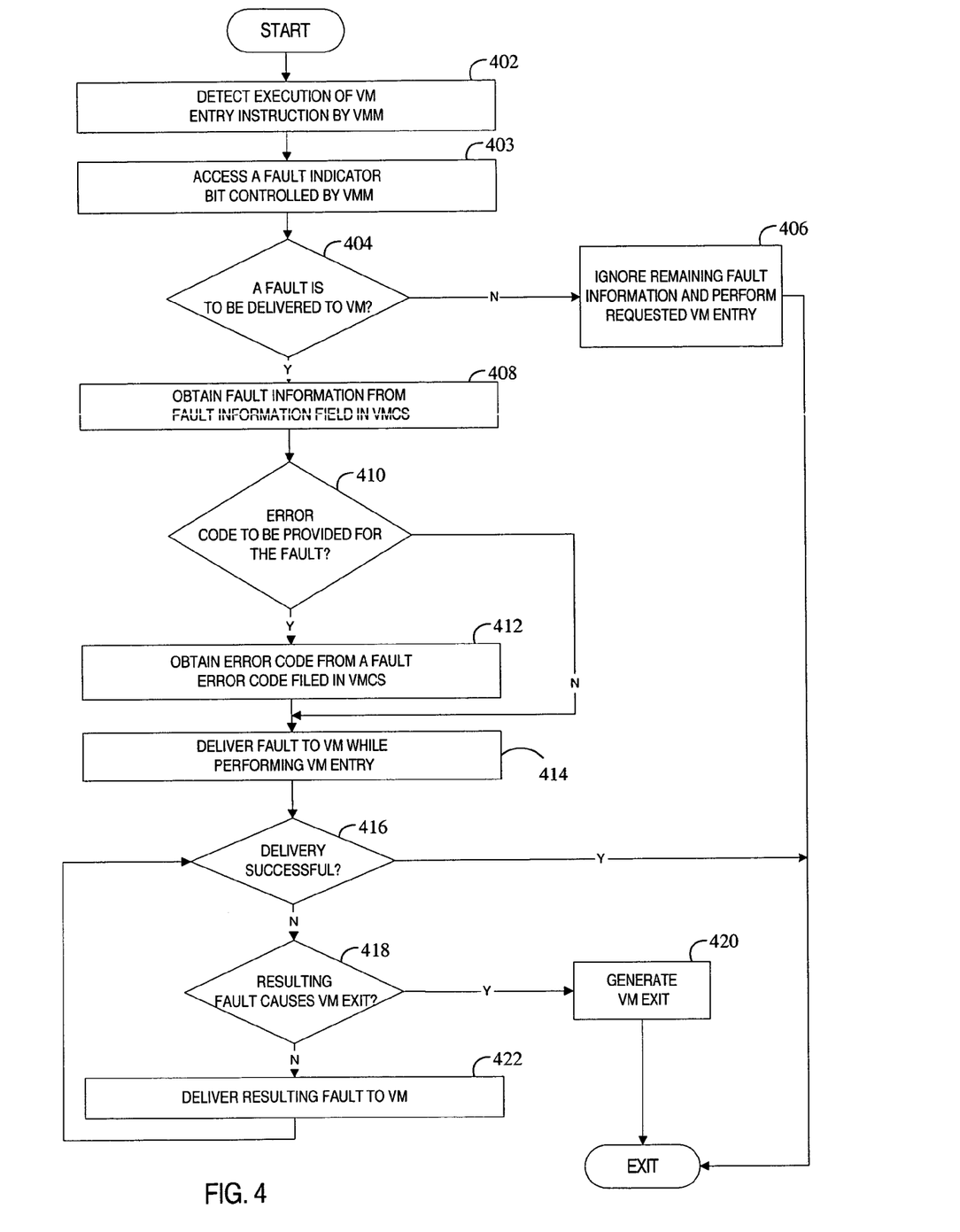
FIG. 4 is a flow diagram of one embodiment of a process for handling a fault in a virtual-machine environment using fault information provided by a VMM.

FIG. 4 is a flow diagram of one embodiment of a process 400 for handling a fault in a virtual-machine environment using fault information provided by a VMM. The process may be performed by processing logic that may comprise hardware (e.g., circuitry, dedicated logic, programmable logic, microcode, etc.), software (such as run on a general purpose computer system or a dedicated machine), or a combination of both. In one embodiment, process 400 is performed by fault delivery logic 124 of FIG. 1.

Referring to FIG. 4, process 400 begins with processing logic detecting an execution of a VM entry instruction by the VMM (processing block 402). In response, processing logic accesses a fault indicator bit controlled by the VMM (processing block 403) and determines whether a fault is to be delivered to the VM that is to be invoked (decision box 404). If not, processing logic ignores the remaining fault information and performs the requested VM entry (processing block 406). If so, processing logic obtains fault information from a fault information field in the VMCS (processing block 408) and determines whether an error code associated with this fault is to be provided to the fault's handler (decision box 410). If so, processing logic obtains the error code from a fault error code field in the VMCS (processing block 412). If not, processing logic proceeds directly to processing block 414.

At processing block 414, processing logic delivers the fault to the VM while performing the VM entry. Processing logic then checks whether the delivery of the fault was successful (decision box 416). If so, process 400 ends. If not, processing logic determines whether a resulting additional fault causes a VM exit (decision box 418). If so, processing logic generates a VM exit (processing block 420). If not, processing logic delivers the additional fault to the VM (processing block 422), and, returning to processing block 416, checking whether this additional fault was delivered successfully. If so, process 400 ends. If not, processing logic returns to decision box 418.

Thus, a method and apparatus for handling faults in a virtual machine environment have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving a request to transition control to a virtual machine (VM) from a virtual machine monitor (VMM);
   determining whether the VMM has requested a delivery of a fault to the VM;
   if the VMM has requested the delivery of the fault to the VM, delivering the fault to the VM when transitioning control to the VM; and
   if the delivery of the fault to the VM is not successful, determining whether a new fault is to be delivered to the VM.

2. The method of claim 1 wherein the request to transition control to the VM is received via an instruction executed by the VMM.

3. The method of claim 1 wherein determining whether the VMM has requested the delivery of the fault to the VM comprises:
   accessing a fault indicator maintained by the VMM; and
   determining whether the fault indicator is set to a delivery value.

4. The method of claim 1 further comprising:
   determining an identifier of the fault and a type of the fault; and
   determining whether the fault is associated with an error code that is to be provided to a handler associated with the fault.

5. The method of claim 4 further comprising:
   if the fault requires the delivery of the error code to the handler associated with the fault, retrieving the error code and providing the error code to the handler.

6. The method of claim 4 wherein:
   the fault indicator, the fault identifier and the type of the fault are stored in a first field; and
   the error code is stored in a second field.

7. The method of claim 6 wherein the first field and the second field are included in a virtual machine control structure (VMCS).

8. The method of claim 1 wherein determining whether a new fault is to be delivered to the VM comprises:
   determining whether the new fault requires a transition of control to the VMM; and
   transitioning control to the VMM if the new fault requires the transition.

9. The method of claim 8 further comprising:
   determining that the new fault does not require a transition of control to the VMM; and
   delivering the new fault to the VM.

10. A computer system comprising:
    a memory having a data structure controlled by a virtual machine monitor (VMM), the data structure storing a fault indicator; and
    a fault delivery logic component, coupled to the memory, to receive a request to transition control to a virtual machine (VM) from the VMM, to determine whether the VMM has requested a delivery of a fault to the VM using the fault indicator, to deliver the fault to the VM when transitioning control to the VM if the VMM has requested the delivery of the fault to the VM, and if the delivery of the fault to the VM is not successful, to determine whether a new fault is to be delivered to the VM.

11. The apparatus of claim 10 wherein the request to transition control to the VM is received via an instruction executed by the VMM.

12. The apparatus of claim 10 wherein the fault delivery logic component is to determine whether the VMM has requested the delivery of the fault to the VM by accessing the fault indicator maintained by the VMM, and determining whether the fault indicator is set to a delivery value.

13. The apparatus of claim 10 wherein the fault delivery logic component is further to determine an identifier of the fault and a type of the fault, and to determine whether the fault is associated with an error code that is to be provided to a handler associated with the fault.

14. The apparatus of claim 13 wherein the fault delivery logic component is further to retrieve the error code and provide the error code to the handler if the fault requires the delivery of the error code to the handler associated with the fault.

15. The apparatus of claim 13 wherein:
the fault indicator, the fault identifier and the type of the fault are stored in a first field; and
the error code is stored in a second field.

16. The apparatus of claim 15 wherein the first field and the second field are included in a virtual machine control structure (VMCS).

17. The apparatus of claim 10 wherein the fault delivery logic component is to determine whether the new fault is to be delivered to the VM by determining whether the new fault requires a transition of control to the VMM, and transitioning control to the VMM if the new fault requires the transition.

18. The apparatus of claim 17 wherein the fault delivery logic component is further to determine that the new fault does not require a transition of control to the VMM, and to deliver the new fault to the VM.

19. A system comprising:
a memory to store guest software; and
a processor, coupled to the memory, to receive a request to transition control to the guest software from a virtual machine monitor (VMM), to determine that the VMM has requested a delivery of a fault to the guest software, to deliver the fault to the guest software when transitioning control to the guest software, and if the delivery of the fault to the guest software is not successful, to determine whether a new fault is to be delivered to the guest software.

20. The system of claim 19 wherein the processor is further to determine whether the VMM has requested the delivery of the fault to the guest software by accessing a fault indicator maintained by the VMM, and determining whether the fault indicator is set to a delivery value.

21. The system of claim 19 wherein the processor is further to determine an identifier of the fault and a type of the fault, and to determine whether the fault is associated with an error code that is to be provided to a handler associated with the fault.

22. The system of claim 21 wherein the processor is further to retrieve the error code and provide the error code to the handler if the fault requires the delivery of the error code to the handler associated with the fault.

23. An article of manufacture comprising:
a machine-readable storage medium containing instructions which, when executed by a processing system, cause the processing system to perform a method, the method comprising:
receiving a request to transition control to a virtual machine (VM) from a virtual machine monitor (VMM);
determining whether the VMM has requested a delivery of a fault to the VM;
if the VMM has requested the delivery of a the fault to the VM, delivering the fault to the VM when transitioning control to the VM; and
if the delivery of the fault to the VM is not successful, determining whether a new fault is to be delivered to the VM.

24. The machine-readable medium of claim 23 wherein the request to transition control to the VM is received via an instruction executed by the VMM.

25. The machine-readable medium of claim 23 wherein determining whether the VMM has requested the delivery of the fault to the VM comprises:
accessing a fault indicator maintained by the VMM; and
determining whether the fault indicator is set to a delivery value.

26. The machine-readable medium of claim 23 wherein the method further comprises:
determining an identifier of the fault and a type of the fault; and
determining whether the fault is associated with an error code that is to be provided to a handler associated with the fault.

* * * * *